US005966284A

United States Patent [19]
Youn et al.

[11] Patent Number: 5,966,284
[45] Date of Patent: Oct. 12, 1999

[54] KEYBOARD MOUNTING APPARATUS FOR A PORTABLE COMPUTER

[75] Inventors: Jae-Sam Youn, Suwon; Sang-Rae Lee, Pyungtack; Pil-Gyu Choi, Suwon, all of Rep. of Korea

[73] Assignee: SamSung Electronics Co., Ltd., Kyungki-do, Rep. of Korea

[21] Appl. No.: 08/903,834

[22] Filed: Jul. 31, 1997

[30] Foreign Application Priority Data

Jul. 31, 1996 [KR] Rep. of Korea ............... 96-31982

[51] Int. Cl.[6] ................................. G06F 1/16
[52] U.S. Cl. ........................... 361/680; 400/682
[58] Field of Search .................. 361/680–683; 364/708.1; 400/682; 345/168, 169

[56] References Cited

U.S. PATENT DOCUMENTS

| | | |
|---|---|---|
| 4,333,155 | 6/1982 | Johnston ............... 364/708.1 |
| 4,870,604 | 9/1989 | Tatsuno ................ 364/708.1 |
| 5,229,757 | 7/1993 | Takamiya et al. . |
| 5,247,285 | 9/1993 | Yokota et al. . |
| 5,260,884 | 11/1993 | Stern . |
| 5,287,245 | 2/1994 | Lucente et al. . |
| 5,331,508 | 7/1994 | Hosoi et al. ............... 361/680 |
| 5,375,076 | 12/1994 | Goodrich et al. . |
| 5,400,213 | 3/1995 | Honda et al. . |
| 5,490,036 | 2/1996 | Lin et al. . |
| 5,510,953 | 4/1996 | Merkel . |
| 5,519,570 | 5/1996 | Chung . |

Primary Examiner—Lynn D. Feild
Attorney, Agent, or Firm—Robert E. Bushnell, Esq.

[57] ABSTRACT

Disclosed is an apparatus for mounting a keyboard to a portable computer, made up of an elastic member for lifting upwardly the keyboard from the bottom of the base; an indented part formed on at least one of the sides of the base plate; a setting member forming symmetrically on the opposite surface to the indented part, which will engage a locking hole formed on the side of the pocket; and a locking member, which is mounted inside the base, for coming out of the base to the pocket to engage the indented part through elasticity or release out of it to remove the keyboard from the base. Therefore, the keyboard mounting apparatus permits a user to easily attach a keyboard to and detach it from a pocket using a simple tool, such as a pen and resulting in preventing damage to a keyboard or base due to use of any metal tools.

19 Claims, 7 Drawing Sheets

KEYBOARD MOUNTING APPARATUS FOR A PORTABLE COMPUTER

CLAIM OF PRIORITY

This application makes reference to, incorporates the same herein, and claims all benefits accruing under 35 U.S.C. § 119 from an application for A Keyboard Mounting Apparatus For a Portable Computer earlier filed in the Korean Industrial Property Office on Jul. 31, 1996 and there duly assigned Ser. No. 31982/1996 and on Nov. 9, 1996 and there duly assigned Ser. No. 39271/1996.

1. Field of the Invention

The present invention relates to a keyboard mounting apparatus for a portable computer with a display panel pivotally mounted to base thereof, and more particularly to an apparatus for mounting to a keyboard to a portable computer, which allows for a user to easily attach a keyboard to and detach it from a base whenever he wants to.

2. Description of the Related Art

U.S. Pat. No. 5,510,953 for a Concealed Locking Assembly For a Removable Portable Computer Keyboard to Merkel and U.S. Pat. No. 5,400,213 for an Electronic Device Having Detachable Keyboard Clamped by a Rotatable Display when Closed over the Keyboard to Honda et al disclose notebook computers with keyboards that can be removed from the notebook computer without the use of screws or other tools. What is needed is a simpler, yet more effective design for detaching and reattaching a keyboard to a notebook computer.

SUMMARY OF THE INVENTION

It is therefore an object of the present invention to provide a novel keyboard mounting apparatus for mounting a keyboard to a portable computer, which allows for a user to easily attach a keyboard to and detach it from a pocket effectively and efficiently.

In accordance with an aspect of the present invention to accomplish the object above, an apparatus for mounting a keyboard to a portable computer, including a base, a display panel pivotally mounted to the base, a keyboard including a base plate with a number of key elements and a pocket for accommodating the keyboard, comprises an elastic member for lifting upwardly the keyboard from the bottom of the pocket; an indented part formed on at least one of the sides of the base plate; and a locking means, which is mounted inside the base, for coming out of the base to the pocket to engage the indented part through elasticity or release out of it to remove the keyboard from the base. The indented part includes at least two recesses thereon. And the locking means comprises a locking member for engaging the indented part and a supporting member for controlling a movement direction of the locking member and supporting it. The supporting member comprises a guiding hole formed on one of the sides of the pocket and a bracket, which projects downwardly from the inner surface of the base, having a supporting hole into which the locking member will fits.

Additionally, the locking member comprises an elongated body passing through the guiding hole and supporting hole; a spring between the guiding hole and supporting hole which permits the elongated body to move backward and forward; a latching lug formed on the end part of the elongated body, which will fits into the indented part through the guiding hole; and a stopper between the latching lug and the elongated body, which controls the range of movement of the elongated body. The distal upper portion of the latching lug slants at a predetermined angle.

The keyboard mounting apparatus further comprises a discharge lug projecting from the side of the pocket and extending from the stopper, which is positioned over the latching lug.

According to another aspect of the present invention, a keyboard mounting apparatus for a portable computer, including a base, a display panel pivotally mounted to the base, a keyboard including a base plate with a number of key elements and a pocket for accommodating the keyboard comprises an elastic member for lifting upwardly the keyboard from the bottom of the base; an indented part formed on at least one of the sides of the base plate; a setting member forming symmetrically on the opposite surface to the indented part, which will engage locking hole formed on the side of the pocket; and a locking means, which is mounted inside the base, for coming out of the base to the pocket to engage the indented part through elasticity or release out of it to remove the keyboard from the base. The indented part includes at least two recesses thereon and the setting member at least two projections. The locking means comprises a locking member for engaging the indented part; and a supporting member for controlling a movement direction of the locking member and supporting it. The supporting member comprises a guiding hole formed on one of the sides of the pocket; and a bracket, which projects downwardly from the inner surface of the base, having a supporting hole into which the locking member will fits. And the locking member comprises an elongated body passing through the guiding hole and supporting hole; a spring between the guiding hole and supporting hole which permits the elongated body to move backward and forward; a latching lug formed on the end part of the elongated body, which will fits into the indented part through the guiding hole; and a stopper between the latching lug and the elongated body, which controls the range of movement of the elongated body. The distal upper portion of the latching lug slants at a predetermined angle. The keyboard mounting apparatus further comprises a discharge lug projecting from the side of the pocket and extending from the stopper, which is positioned over the latching lug.

Therefore, the advantage of the present invention is that it is possible for a user to easily attach a keyboard to and detach it from a pocket using a simple tool, such as a pen and resulting in preventing damage to a keyboard or base due to use of any metal tools.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
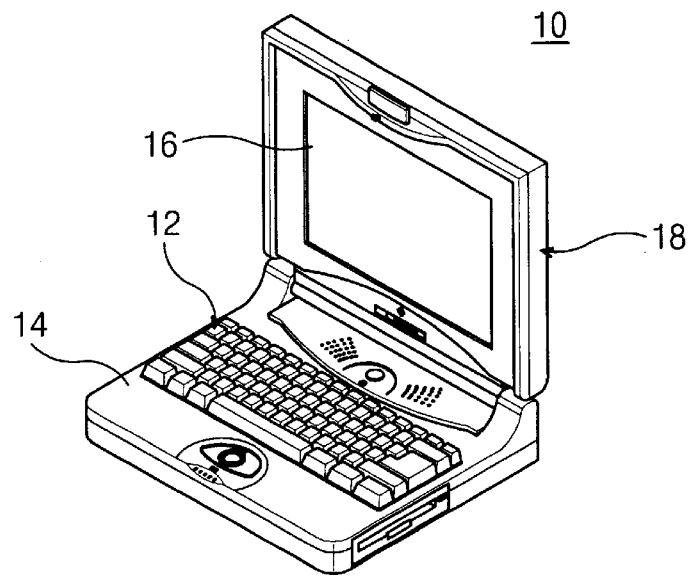
FIG. 1 is a perspective view of a typical portable computer.

A portable computer 10, such as a notebook computer or a laptop computer, generally has a base 14 for accommodating a keyboard 12 therein and the pivotally mounted a display panel 18, or lid with a liquid crystal display 16 on one of sides thereof as seen FIG. 1.

Figure 2:
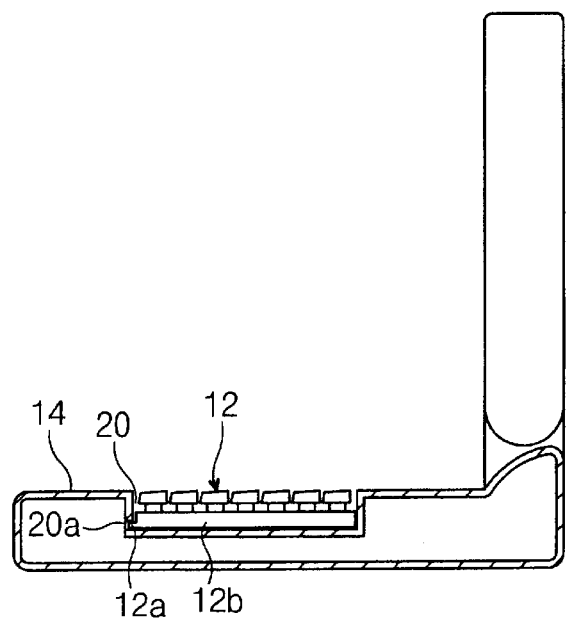
FIG. 2 is a side sectional view showing a base of the portable computer to which a keyboard is mounted by a conventional keyboard mounting apparatus.

Such a keyboard mounting apparatus to a portable computer, as shown in FIG. 2, comprises a plurality of spaced projections 12b projecting symmetrically from a base plate 12a which is composed of a keyboard and a plurality of locking holes 20a into which the respective projections will be fitted and which are formed on the predetermined edges of the base plate.

In a conventional keyboard mounting apparatus, while the keyboard is raised a little over the pocket, it is pushed inwardly and each of the projections 12b of the base plate 12a is fitted into the respective corresponding locking hole 20a of the pocket 20. As a result, the mounting of the keyboard is completed.

A keyboard mounting apparatus, which is applied to a portable computer including a pocket 20 accommodating a detachable keyboard 12 with a base plate 12a therein, comprises an elastic member 40 for lifting upwardly the keyboard 12 from the bottom of the pocket 20; an indented part formed on at least one of the sides of the base plate 12a; and a locking means which is mounted in the pocket 20 and facing the indented part, wherein a latching lug 42 moving in a horizontal direction engages the indented part or releases out of it through elasticity. Additionally, one or more locking means is formed on the opposite surface to the indented part of the base plate 12a. Also, the locking means can be formed on one of the facing sides of the base plate 12a. Further, a setting member, which allows for the base plate 12a to fit into a locking hole 20a, is formed on the opposite side. The keyboard 12 can be easily attached to or detached from the pocket 20 to a base 14 by using any simple tool, such as a pen.

Figure 3:
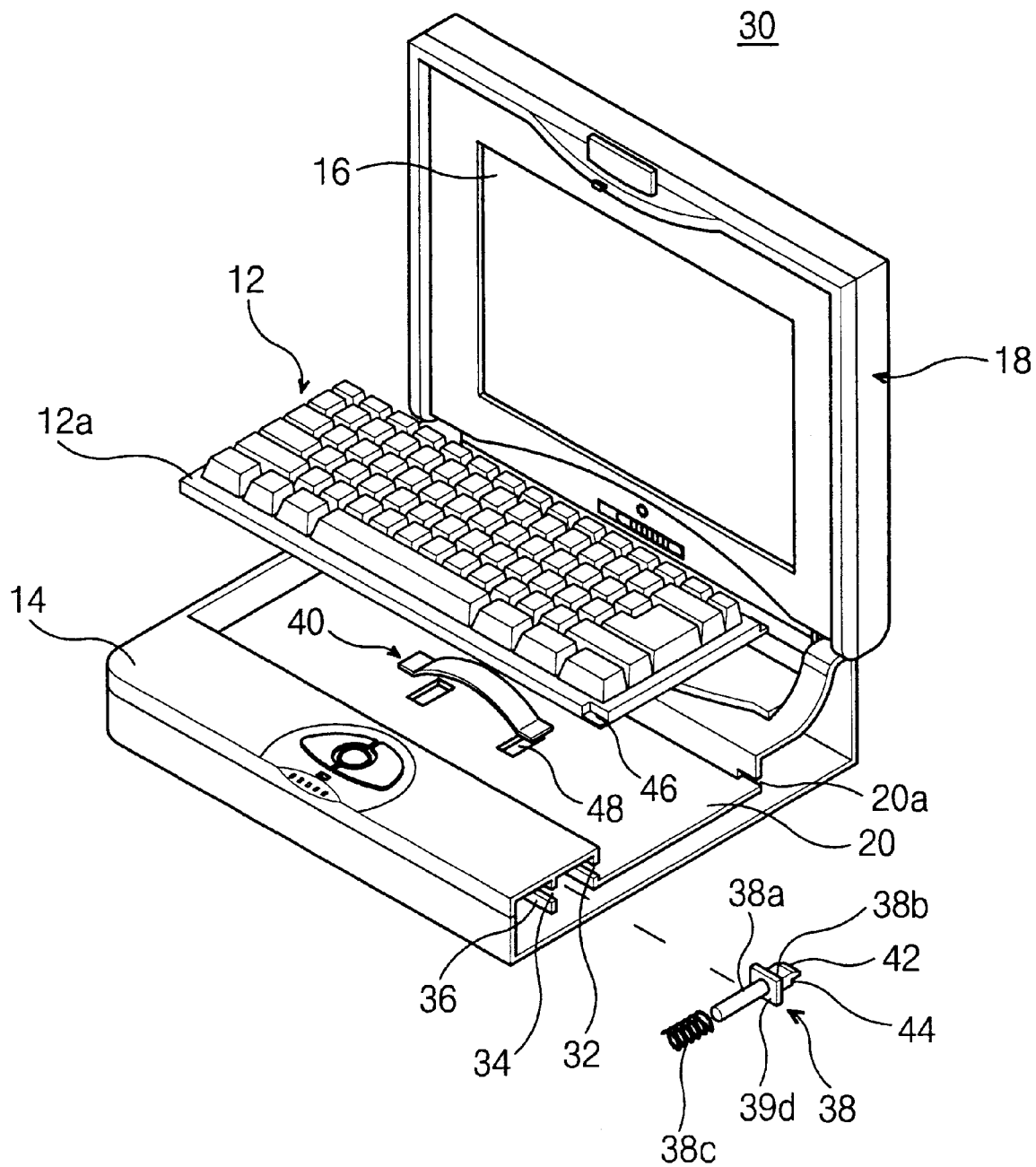
FIG. 3 is an exploded perspective view showing a portable computer to which a keyboard is mounted by a novel keyboard mounting apparatus according to an embodiment of the present invention.

As seen in FIG. 3, an apparatus for mounting a keyboard 12 to a portable computer including a base 14, a display panel pivotally mounted to the base, 14, a keyboard 12 including a base also referred to as a housing in the claims, plate 12a with a number of key elements and a pocket 20 for accommodating the keyboard 12 includes an elastic member 40 for lifting upwardly the keyboard 12 from the bottom of the base 14; a pair of indented parts, also referred to as cavities in the claims, formed on one of both sides of the base plate 12a; a setting member forming on the opposite side to the indented part of the base plate 12a and a locking means also referred to as a lock in the claims, which is mounted inside the base 14, for coming out of the base 14 to the pocket 20 to engage the indented part through elasticity or release out of it to remove the keyboard 12 from the base 14. Also, the indented part includes two recesses 46 and the setting member two projections 12b.

The locking means includes a locking member 38 for engaging the indented part and a supporting member for controlling a movement direction of the locking member 38 and supporting it. The supporting member includes a guiding hole, also referred to as a hole in the claims 32 formed on one of the sides of the pocket 20, and a bracket 36, which projects downwardly from the inner surface of the base 14, having a supporting hole 34 into which the locking member 38 will fits. The locking member 38 includes an elongated body 38a passing through the guiding hole 32 and supporting hole 34; a spring 38c between the guiding hole 32 and supporting hole 34 which permits the elongated body 38a to move backward and forward; a latching lug, or latch 42 formed on the end part of the elongated body 38a, which will fits into the indented part through the guiding hole 32; and a stopper 38d between the latching lug 42 and the elongated body 38a, which controls the range of movement of the elongated body 38a The stopper 38d composed of the locking member 38 is round-shaped or square-shaped, which is larger than the guiding hole 32 in width and the latching lug 42 projecting from the stopper 38d is a column which is smaller than a diameter of the guiding hole 32.

The spring 38c composed of the locking member 38 is compressed by the stopper 38d pushed inwardly when a base plate 12a is put into the pocket 20 and then is again returned toward the pocket 20 as the press is released. The upper part of the latching lug 42 slants at a predetermined angle for a complete installation.

Figure 4A:
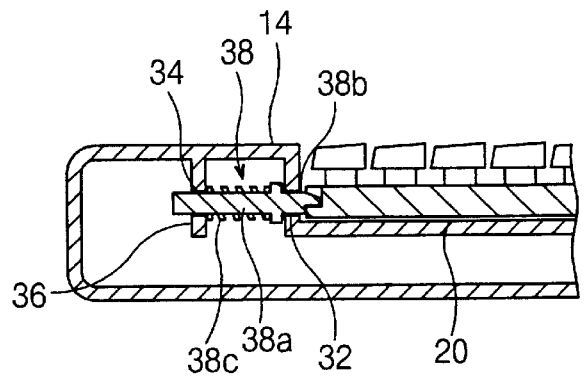
FIG. 4A is a side sectional view of a base of the portable computer in which the keyboard mounting apparatus shown in FIG. 3 is implemented.

As shown in FIG. 4A, the locking member 38 between the guiding hole 32 and supporting hole 34 is supported by a spring 38c. Further, the latching lug 42 comes out within the pocket 20 through the guiding hole 32 while the elongated body 38a is fitted into the supporting hole 34 of the bracket 36.

Figure 4B:
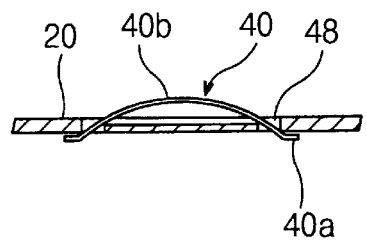
FIG. 4B is a side view partially showing the installation of an elastic member to a keyboard pocket in the keyboard mounting apparatus shown in FIG. 3.

As shown in FIG. 4B, the elastic member 40 includes a pair of horizontal parts 40a on end parts thereof to be put into respective recesses 48 and is bent. When the horizontal parts are put into the spaced recesses 48, the bent part 40b with being convex-shaped produces an elasticity that lifts a keyboard 12 from the pocket 20.

Figure 5:
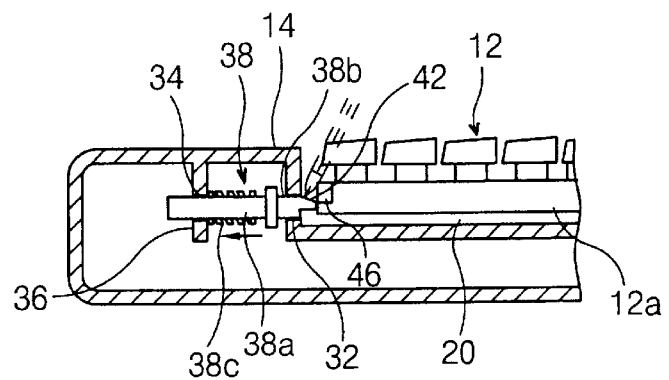
FIG. 5 is a side sectional view of the base for showing the removal of a keyboard from the keyboard mounting apparatus.

The keyboard 12, as shown in FIG. 5, is mounted to the pocket 20 by fitting the respective latching lug 42 into the respective recesses 46 formed on the base plate 12a. When the locking member 38 of the locking means is hooked to the recess 46, the elasticity of the elastic member 40 is suppressed. In this state, in case the keyboard 12 is to be lifted from the pocket 20, a simple tool, such as a pen is put between the keyboard 12 and the base 14, and the end part of the latching lug 42 is pushed. And then the projection 12*b* is pushed inwardly. That is to say, immediately the hooking of the keyboard 12 is released, the pressed bent part 40*b* recovers the elasticity. Accordingly, the front part of the keyboard 12 is lifted at a certain height. At this time, when front part of the keyboard 12 is pulled forwardly, the latching lug 42 are escaped out of the locking holes 46 of the pocket 20 and are detached from the pocket 20 completely.

Figure 6:
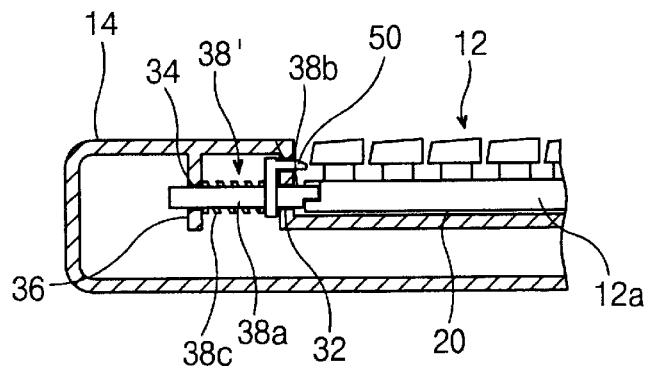
FIG. 6 is a side sectional view of the base for showing a discharge lug in the keyboard mounting apparatus.

FIG. 6 is a side view showing a major structure of the keyboard mounting apparatus according to the present invention. Especially, this figure shows another embodiment of the locking member 38'. As shown in FIG. 6, the locking member 38 includes a stopper 38*d* extending therefrom and a discharge lug 50, at a right angle, extending upwardly from therefrom.

Figure 7:
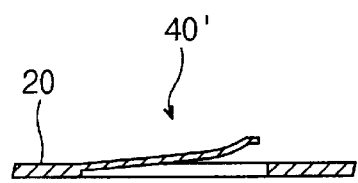
FIG. 7 is a side view partially showing the installation of another elastic member to the keyboard pocket in the keyboard mounting apparatus.
Figure 8:
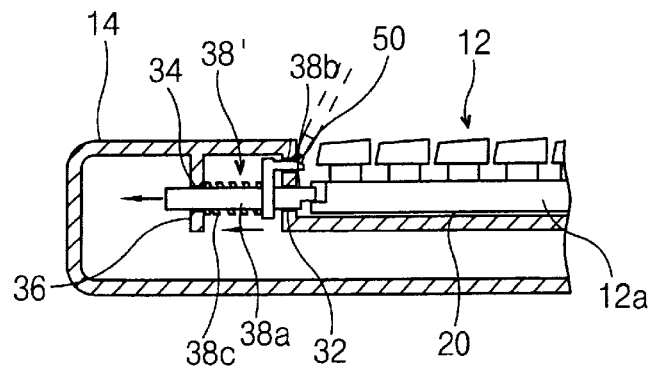
FIG. 8 is a side sectional view of the base for showing the removal of the keyboard from the keyboard mounting apparatus using the discharge lug.

FIG. 7 is a side sectional view showing another example of the elastic member 40' of the present invention. The elastic member 40 is in a free end form, that is, which has an end part extending from the bottom surface of the pocket 20 and springs out at a predetermined angle from the bottom. Therefore, as shown in FIG. 8, the discharge lug, also referred to as a release switch in the claims, 50 helps a user to more easily attach to or detach from the keyboard.

Figure 9:
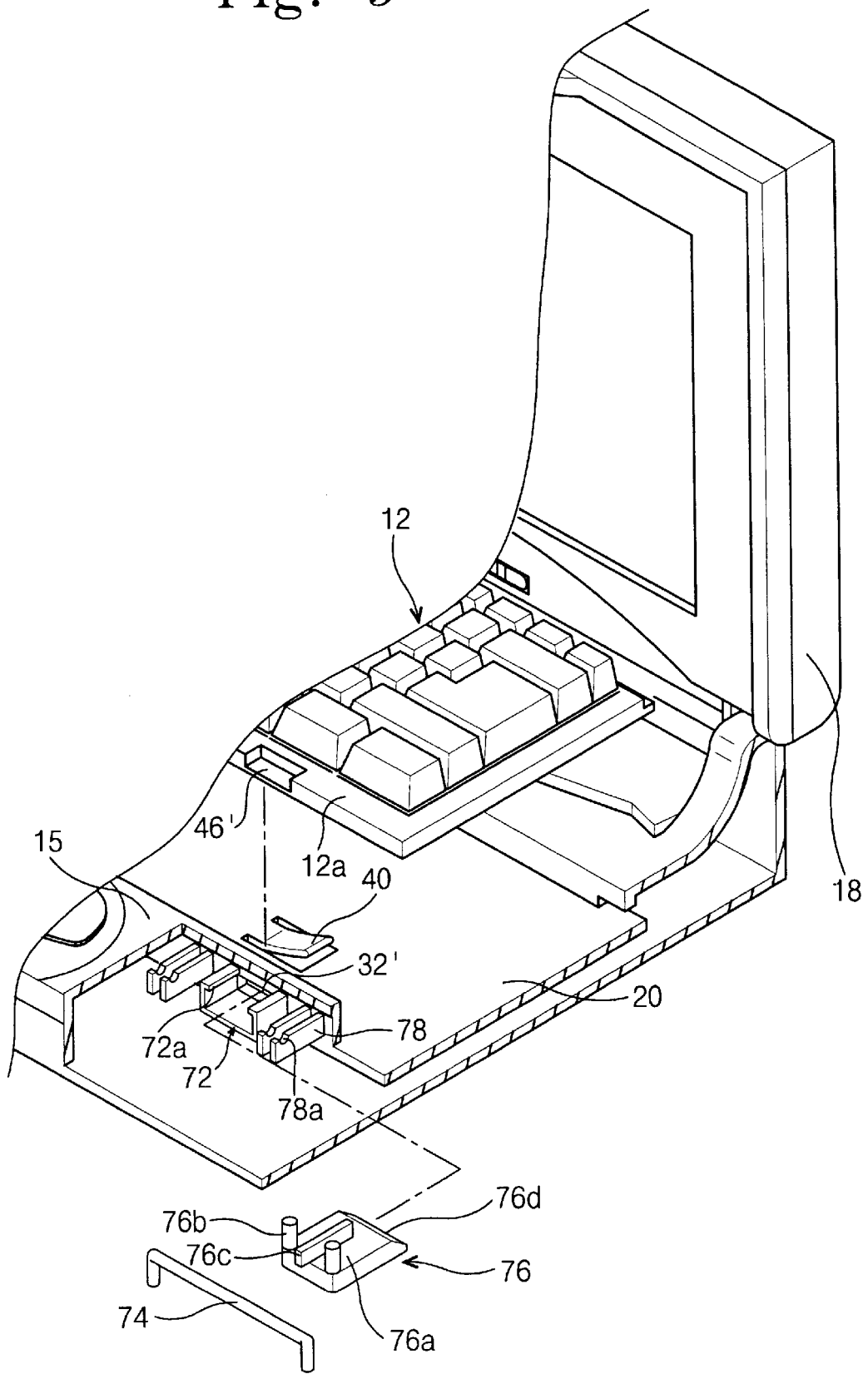
FIG. 9 is an exploded perspective view showing a portable computer to which a keyboard is mounted by a novel keyboard mounting apparatus according to a second embodiment of the present invention.

Hereinafter, the keyboard mounting apparatus according to the second embodiment of the present invention will be described with reference to FIGS. 9 through 13. Referring to FIG. 9, the keyboard mounting apparatus has an elastic member 40' which is established on a pocket to for accommodating the keyboard 12, and a locking means which is supported by an elasticity inside a guiding hole 32' and projected to the pocket 20. The guiding hole 32' is formed at the side wall of the pocket 20.

The locking means is broadly classified into two main sections, a locking member 76 and a supporting member. The locking member 76 is provided to attach or detach the keyboard 12 to or from the pocket 20. The supporting member is provided to guide and support the locking member 76.

The supporting member includes a guiding member 72 which is projected from the side wall of the pocket 20 and connected in communication with the guiding hole 32'. The locking member includes a locking body 76*a* having a tapered portion 76*d* at one end thereof, a stopper 76*b* projected upwardly from the upper surface of the locking body 76*a*, a rib 76*c* secured on the locking body 76*a* to control the range of movement of the locking body 76*a*. The rib 76*c* is also provided to prevent the deviation of a spring 74 from the locking body 76*a*. This spring 74 has end portions which are downwardly bent at both ends thereof, and the end portions are located at grooves 78*a* which are formed on spring hooking members 78. These spring hooking members 78 are located at both sides of the guiding member 72. The tapered portion 76*d* of the locking member 76 is located through the guiding hole 32' on a spaced recess 46' of the base plate 12*a*.

The spring 74 is compressed by the stopper 76*b* pushed inwardly when the base plate 12*a* is put into the pocket 20 and then is returned toward the pocket 20 as the press is released.

Figure 10:
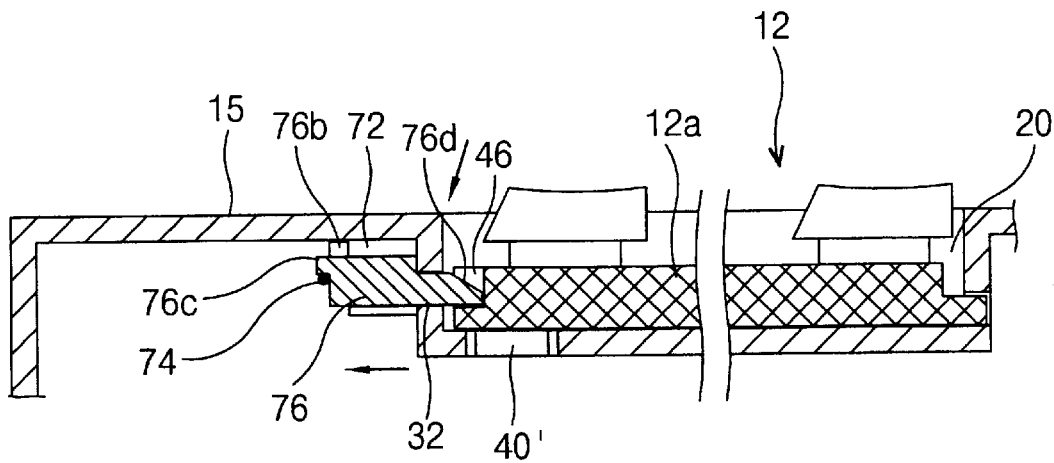
FIG. 10 is a side view partially showing a base of the portable computer in which the keyboard mounting apparatus shown in FIG. 9 is inplemented.
Figure 11:
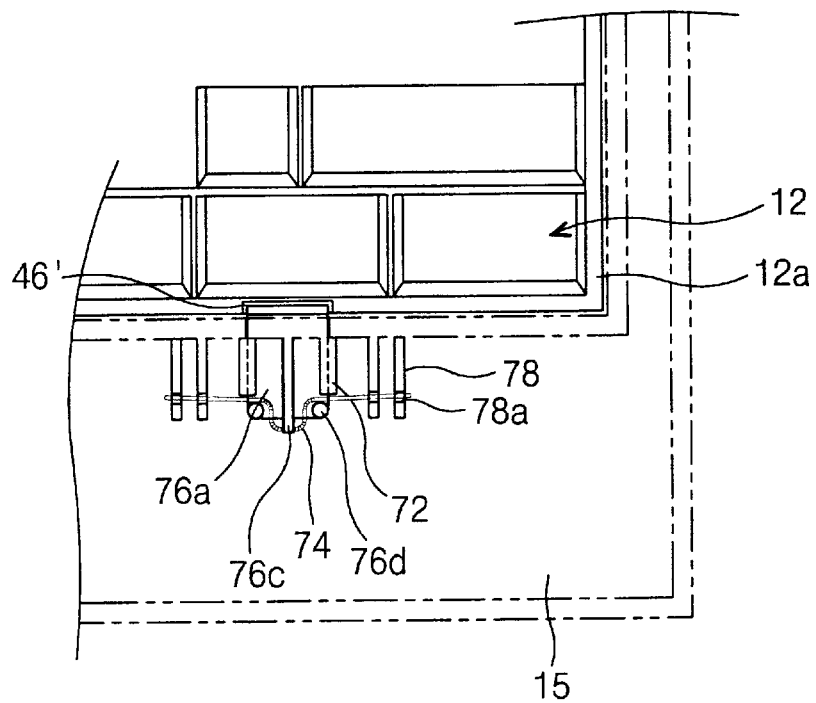
FIG. 11 is a top sectional view partially showing of the keyboard mounting apparatus shown in FIG. 9.

As shown in FIGS. 10 and 11, the locking member 76 which is located through the guiding hole 32' on the spaced recess 46' is supported by the spring 74. That is, the tapered portion 76*d* of the locking member 76 comes out within the pocket through the guiding hole 32' while the locking body 76*a* is fitted into the guiding member 72 by means of the spring 74, which is hooked in both grooves 78*a* of the spring hooking members 78.

Figure 12:
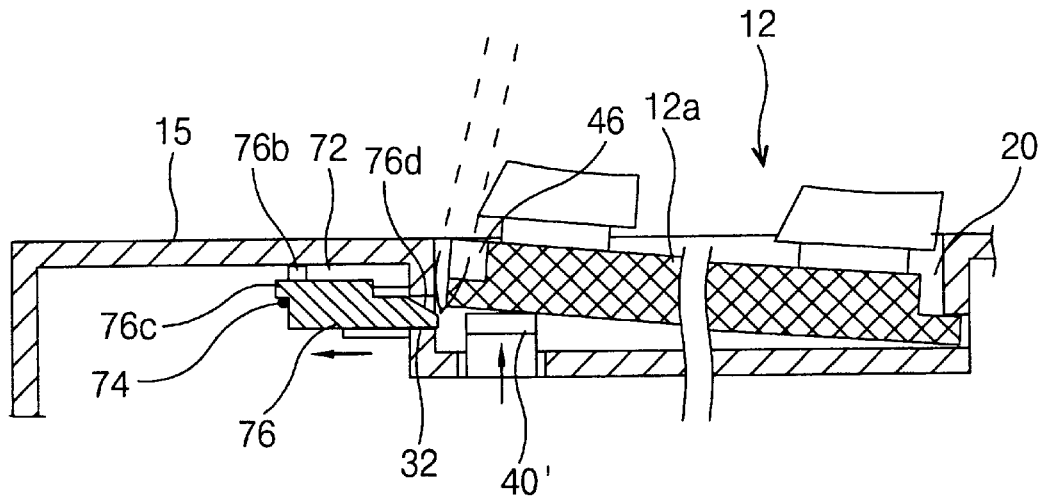
FIG. 12 is a side sectional view of the base for showing the removal of a keyboard from the keyboard mounting apparatus shown in FIG. 9.
Figure 13:
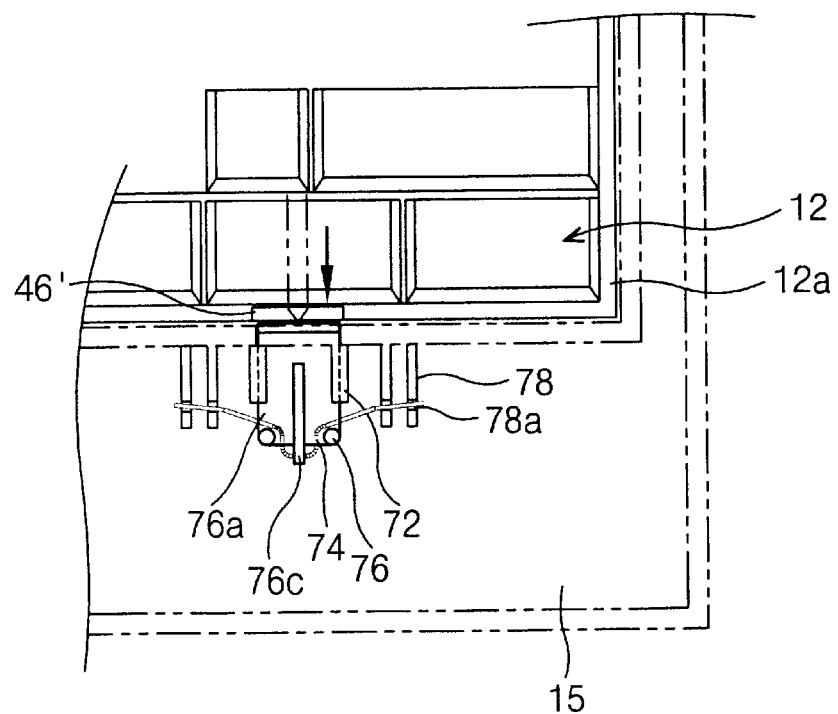
FIG. 13 is a top sectional view partially showing of the keyboard mounting apparatus shown in FIG. 9.

The keyboard 12, as shown in FIGS. 12 and 13, is mounted to the pocket by fitting the locking body 76*a* into the recess 46' formed on the base plate 12*a*. When the locking member 76 of the locking means is hooked to the recess 46', the elasticity of the spring 74 is provided to the rib 76*c*. In this case, when the keyboard 12 is to be lifted from the pocket 20, a simple tool, such as a pen is put between the keyboard 12 and the base 14, and the end part of the locking body 76*a* is pushed. That is to say, immediately the hooking of the keyboard 12 is released, the elastic member 40' (referring to FIG. 9), such as a plate spring recovers the elasticity. Accordingly, the front part of the keyboard 12 is lifted at a certain height. At this time, when the front part of the keyboard 12 is pulled forwardly, the locking body 76*a* is escaped out of the spaced recess 46' of the pocket 20 and are detached from the pocket 20 completely.

As described above, according to the keyboard mounting apparatus of the present invention, it is possible for a user to easily attach a keyboard to and detach it from a pocket using a simple tool, such as a pen and resulting in preventing damage to a keyboard or base due to use of any metal tools.

What is claimed is:

1. A portable computer having a detachable keyboard comprising:

a housing accommodating a display panel and having a recess defining a pocket for mounting a keyboard;

said keyboard attached to a base plate having an cavity allowing said keyboard to be engaged by said housing;

an elastic member attached to said pocket biasing said keyboard to be disengaged with said pocket; and a lock mounted inside the base and projecting into said pocket for engaging said cavity in said base plate to secure said keyboard in said pocket, said lock comprising:

a side of said pocket bearing a hole;

an elongated body disposed in said base for engaging said base plate via said hole;

a spring positioned over said elongated body for biasing said elongated body in a position for engaging said base plate of said keyboard; and a latch attached to said elongated body for engaging said cavity in said base plate to secure said keyboard to said portable computer.

2. The portable computer of claim 1, wherein said keyboard has at least two cavities in said base plate.

3. The portable computer of claim 1, further comprising:

a stopper attached to the elongated body for limiting the movement of the elongated body; and a release switch attached to said stopper and projecting through said side of said pocket, for disengaging said keyboard when said release switch is depressed.

4. The portable computer of claim 1, with said lock further comprising a bracket diposed in said base for supporting said elongated body.

5. The portable computer of claim 4, with said elastic member comprising a band having two ends each secured to a bottom surface of said pocket, said band being attached to cause a convex shaped bow in said band for biasing said keyboard into a detached position.

6. The portable computer of claim 4, with said elastic member comprising a portion of a bottom surface elastically projecting into said pocket to bias said keyboard into a detached position.

7. A portable computer having a detachable keyboard, comprising:
- a housing accommodating a display panel and having a recess defining a pocket for engaging a keyboard;
- said keyboard attached to a base plate having a cavity allowing said keyboard to be engaged by said housing;
- a band of elastic material having two ends each secured to a bottom surface of said pocket, said band having a convex bow shape for biasing said keyboard into a detached position; and
- a lock disposed inside the base and projecting into said pocket for engaging said cavity to detachably secure said keyboard in said pocket.

8. The portable computer of claim 7, wherein said base plate has two cavities.

9. The portable computer of claim 7, wherein said lock comprises:
- a locking member having a substantially rectangular shape, a pair of stoppers attached to a top side, and a rib attached to said top side; and
- an elastic member biasing said locking member into a position engaging an end of said locking member with said cavity in said base plate to secure said keyboard in said pocket of said portable computer.

10. The portable computer of claim 7, wherein said lock comprises:
- a side of said pocket bearing a hole
- a bracket disposed in the base:
  - an elongated body supported by said bracket and projecting through said hole;
  - a spring positioned over the elongated body and biasing said elongated body into a position for engaging said base plate of said keyboard;
  - a latch formed on an end part of the elongated body for engaging said cavity in said base plate to secure said keyboard to said portable computer; and
  - a stopper attached to the elongated body for limiting the movement of the elongated body.

11. The portable computer of claim 10, wherein a distal upper portion of said latch slants at a predetermined angle.

12. The portable computer of claim 10, comprising a release switch attached to said stopper and projecting through said side of said pocket, said release switch causing said locking means to release said keyboard when said release switch is depressed.

13. A notebook computer having a detachable keyboard, comprising:
- a housing accommodating a cover containing a display unit and enclosing a central processing unit and a memory, and a base having a pocket for receiving a keyboard;
- said keyboard having a base plate with a cavity allowing said keyboard to be engaged by said housing;
- an elastic member secured to a bottom surface of said pocket elastically projecting into said pocket to bias said keyboard into a detached position; and
- lock for engaging said keyboard with said notebook computer.

14. The notebook computer of claim 13, with said lock comprising:
- a locking member having a substantially rectangular shape, a pair of stoppers attached to a top side, and a rib attached to said top surface; and
- an elastic member biasing said locking member into a position engaging said cavity in said base plate to secure said keyboard in said pocket of said notebook computer.

15. The notebook computer of claim 13, with said lock comprising:
- an elongated body disposed in said base and protruding from a side of said pocket;
- a spring positioned around said elongated body;
- a latch attached to said elongated body for engaging said cavity in said base plate of said keyboard; and
- said side of said pocket bearing a guiding hole occupied by said elongated body; and
- a stopper attached to said elongated body for biasing said elongated body into a position for engaging said keyboard.

16. The notebook computer of claim 15, said first end of said locking means having a release switch attached to said stopper and projecting through said side of said socket, said release switch causing said lock to release said keyboard when said release switch is depressed.

17. The notebook computer of claim 13, said locking means comprising:
- a locking member;
- a latch located at an end of said locking member for engaging said cavity in said base plate;
- a stopper and a rib attached to a top side of said locking member; and
- a tension spring attached to said locking member between said stopper and said rib, biasing said locking member towards said keyboard.

18. The notebook computer of claim 13, said elastic member located near the center of said pocket.

19. The notebook computer of claim 13, said elastic member located adjacent to where said lock meets said keyboard.

* * * * *